United States Patent
Flood

(10) Patent No.: US 12,222,037 B2
(45) Date of Patent: Feb. 11, 2025

(54) PISTON RING ARRANGEMENT, PISTON COMPRESSOR AND METHOD FOR SEALING A COMPRESSION CHAMBER

(71) Applicant: BURCKHARDT COMPRESSION AG, Winterthur (CH)

(72) Inventor: David Flood, Watford (GB)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 17/908,569

(22) PCT Filed: Mar. 3, 2021

(86) PCT No.: PCT/EP2021/055294
§ 371 (c)(1),
(2) Date: Sep. 1, 2022

(87) PCT Pub. No.: WO2021/175905
PCT Pub. Date: Sep. 10, 2021

(65) Prior Publication Data
US 2023/0184332 A1 Jun. 15, 2023

(30) Foreign Application Priority Data
Mar. 3, 2020 (EP) .................................... 20160779

(51) Int. Cl.
*F16J 9/28* (2006.01)
*F04B 39/04* (2006.01)
(Continued)

(52) U.S. Cl.
CPC .............. *F16J 9/28* (2013.01); *F04B 39/042* (2013.01); *F16J 9/02* (2013.01); *F16J 9/06* (2013.01);
(Continued)

(58) Field of Classification Search
CPC . F16J 9/28; F16J 9/02; F16J 9/06; F16J 9/16; F16J 15/24; F16J 15/28; F16J 15/56; F04B 39/042
See application file for complete search history.

(56) References Cited

U.S. PATENT DOCUMENTS 2,927,831 A * 3/1960 Tuczek ................ F16J 15/3204
277/467
6,457,722 B1 10/2002 Fiestel
(Continued)

FOREIGN PATENT DOCUMENTS

DE 102016108393 B4 * 9/2022 ............... F16J 9/063

OTHER PUBLICATIONS

International Search report for PCT/EP2021/055294, prepared by the European Patent Office, mailing date Mar. 19, 2021, 12 pages including English Translation.

*Primary Examiner* — Gilbert Y Lee
(74) *Attorney, Agent, or Firm* — Brooks Kushman P.C.

(57) ABSTRACT

The piston ring assembly having a first and a second endless sealing ring and an elastic ring carrier, the first and the second sealing ring extending in a circumferential direction (U) and each having an outer circumferential surface, the first sealing ring having a first center point (M1) with respect to its outer circumferential surface and the second sealing ring having a second center point (M2) with respect to its outer circumferential surface, the first and second sealing rings each having a longitudinal axis (L) running perpendicular to the circumferential direction (U), wherein the ring carrier runs in the circumferential direction (U), and wherein the ring carrier and the first and second sealing rings are designed to be mutually adapted in such a way that the first and second sealing rings are arranged one after the other in the ring carrier in the direction of the longitudinal axis (L), and in that their first and second centers (M1, M2) are
(Continued)

arranged at a distance from one another radially with respect to the longitudinal axis (L), the sealing rings being pressed in opposite directions against the inner wall of a cylinder when the piston ring assembly is used in accordance with the invention.

15 Claims, 7 Drawing Sheets

(51) Int. Cl.
*F16J 9/02* (2006.01)
*F16J 9/06* (2006.01)
*F16J 9/16* (2006.01)
*F16J 15/24* (2006.01)
*F16J 15/28* (2006.01)

(52) U.S. Cl.
CPC ................ *F16J 9/16* (2013.01); *F16J 15/24* (2013.01); *F16J 15/28* (2013.01)

(56) References Cited

U.S. PATENT DOCUMENTS

| | | | |
|---|---|---|---|
| 8,985,588 B2 * | 3/2015 | Feistel | F04B 53/143 |
| | | | 277/491 |
| 10,184,563 B2 * | 1/2019 | Koop | F16J 15/26 |
| 2003/0006562 A1 | 1/2003 | Feistel | |
| 2013/0154197 A1 | 6/2013 | Feistel | |
| 2020/0096106 A1 | 3/2020 | Feistel | |

* cited by examiner

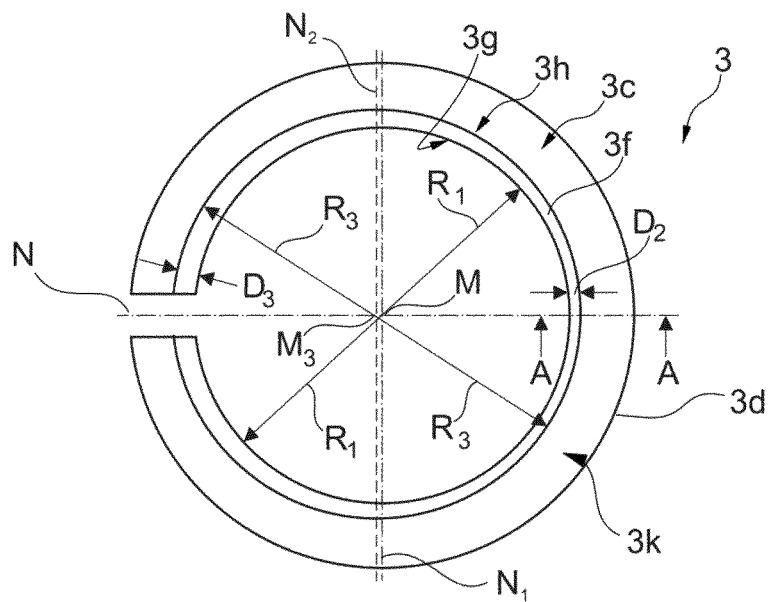
Fig. 4
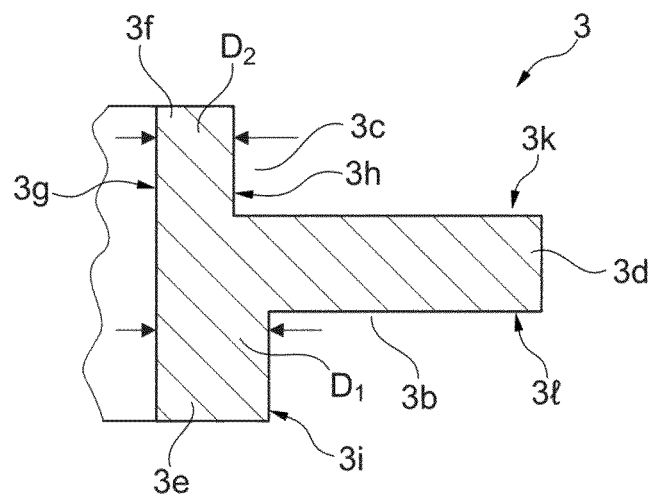
Fig. 5 (A-A)
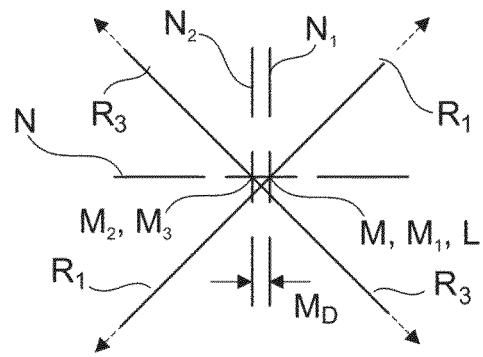
Fig. 6

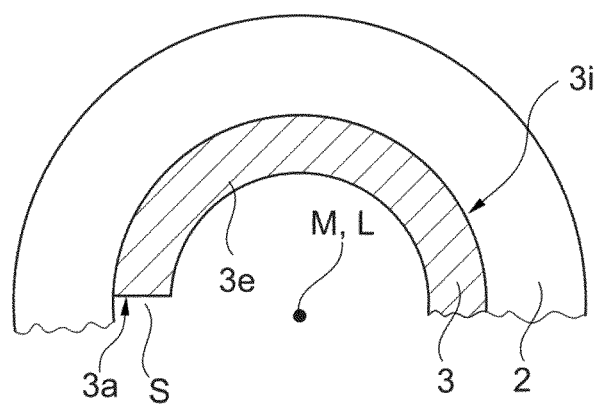
Fig. 10 (B-B)
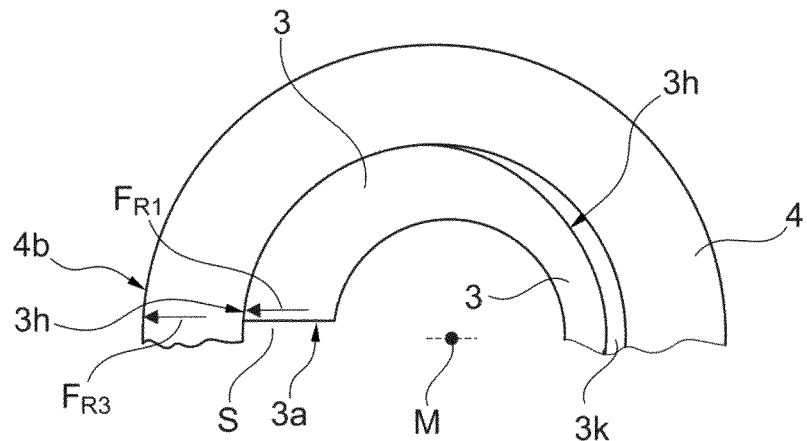
Fig. 11 (D-D)
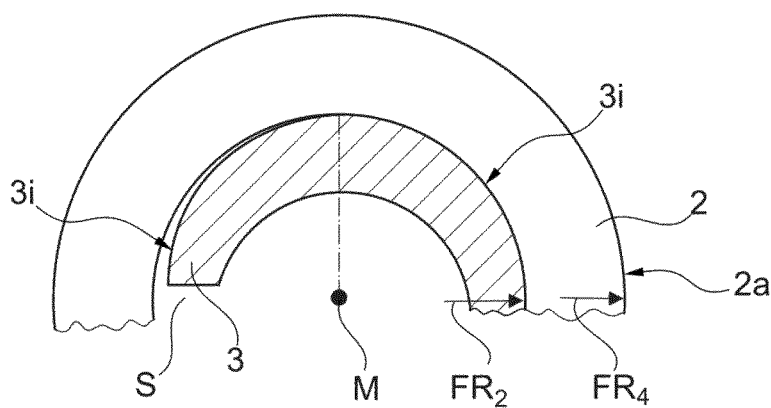
Fig. 12 (C-C)

PISTON RING ARRANGEMENT, PISTON COMPRESSOR AND METHOD FOR SEALING A COMPRESSION CHAMBER

CROSS-REFERENCE TO RELATED APPLICATION

This application is the U.S. national phase of PCT Application No. PCT/EP2021/055294 filed on Mar. 3, 2021, which claims priority to EP patent application No. 20160779.3 filed on Mar. 3, 2020, the disclosures of which are incorporated in their entirety by reference herein.

The invention relates to a piston ring assembly. The invention further relates to a piston compressor comprising a piston ring assembly. The invention further relates to a method of sealing a compression chamber.

STATE OF THE ART

Piston compressors comprising a cylinder and a piston that is linearly movable therein are known. In one possible embodiment, a piston ring is arranged on the piston, the piston ring sliding along the cylinder wall so that the piston ring seals off the compression chamber bounded by the cylinder and the movable piston. The publication WO 98/55783A1 discloses in FIG. 6 a dry-running piston compressor with a piston ring arranged on the piston and rubbing against the cylinder wall. This known piston ring is only suitable to a limited extent for use at high pressure differentials, since it exhibits pronounced cold flow under load, which results in rapid wear of the piston ring. US 2013/0154197 A1 discloses a sealing arrangement for a piston rod of a piston compressor, the sealing arrangement comprising two endless sealing rings which are movably mounted in a common ring carrier transversely to the running direction of the piston rod for wear compensation. However, this sealing arrangement does not contribute to the sealing of the compression chamber bounded by the cylinder and the movable piston.

STATEMENT OF THE INVENTION

It is the object of the invention to provide a piston ring assembly as well as a piston compressor having more advantageous operating characteristics.

This object is solved with a piston ring assembly disclosed herein. The object is further solved with a piston compressor disclosed herein. The object is further solved with a method of sealing a compression chamber disclosed herein. The object is further solved with a use of the piston ring assembly as a pressure breaker for sealing dynamic pressure components as disclosed herein.

The object is solved in particular with a piston ring assembly comprising a first and a second endless sealing ring as well as an elastic ring carrier, wherein the first and the second sealing ring extend in a circumferential direction and each have an outer circumferential surface, wherein the first sealing ring has a first center point with respect to its outer circumferential surface and the second sealing ring has a second center point with respect to its outer circumferential surface, wherein the first and the second sealing ring each have a longitudinal axis running perpendicular to the circumferential direction, wherein the ring carrier runs in the circumferential direction, and wherein the ring carrier as well as the first and the second sealing ring are designed to be mutually adapted in such a way that the first and the second sealing ring are arranged successively in the ring carrier in the direction of the longitudinal axis, and that their first and second centers are arranged mutually spaced apart radially with respect to the longitudinal axis.

The object is further solved with a piston compressor comprising a cylinder, comprising a piston arranged in the cylinder, and comprising at least one piston ring assembly according to the invention arranged on the piston.

The piston compressor comprises a cylinder and a piston, which delimit a compression chamber, the piston advantageously having, starting from the compression chamber, in the direction of the longitudinal axis a first partial section and subsequently a second partial section, at least one piston ring assembly being arranged along the first partial section, and preferably at least one piston ring sealing a static pressure being arranged along the second partial section, the piston ring assembly preferably sealing dynamic pressure components.

The object is further solved with a method of sealing a compression chamber which is delimited by a cylinder and a piston arranged therein and movable in the direction of a longitudinal axis, wherein a piston ring assembly comprising a first and a second endless sealing ring is arranged on the piston, wherein the first and the second endless sealing ring are pressed in an idle state transversely, in particular perpendicular to the longitudinal axis are pressed in opposite directions against an inner wall of the cylinder, and wherein the first and second endless sealing rings are additionally pressed in the opposite direction against the inner wall of the cylinder during the compression phase of the piston by the internal pressure rising in the compression chamber of the cylinder.

In an advantageous embodiment, the piston ring assembly according to the invention is not completely sealed in the longitudinal direction, but only partially. Such a piston ring assembly is particularly suitable as a pressure breaker, for sealing dynamic pressure components.

The piston ring assembly according to the invention has the advantage that it can be designed to be extremely stable and is suitable for high applied pressure differences, for example for pressures up to 500 bar, and is particularly suitable for compressing hydrogen. One of the reasons why the piston ring assembly according to the invention is extremely stable is that the sealing rings are of endless and one piece design, the sealing rings preferably consisting of a wearable material, in particular of a metal such as bronze, gray cast iron or sintered iron, or of a plastic such as PTFE, filled PTFE or high-temperature polymers such as PEEK, PI or epoxy. The piston ring assembly according to the invention comprises two sealing rings that are pressed against the inner wall of a cylinder in opposite directions. As a result, each sealing ring is pressed against the inner wall of the cylinder on one side and, with respect to the longitudinal axis, a small gap is created between the sealing ring and the inner wall of the cylinder on the opposite side, especially if the sealing ring already shows some wear. The piston ring assembly according to the invention comprises two sealing rings, a first sealing ring and a second sealing ring, arranged in succession in the longitudinal direction, wherein the first sealing ring is pressed against the inner cylinder wall on one side, and the second sealing ring is pressed against the inner cylinder wall on the opposite side with respect to the longitudinal axis. This results in a very good sealing effect in the longitudinal direction, although the piston ring assembly according to the invention is not necessarily completely sealed in the direction of the longitudinal axis due to the small gaps that may occur between the sealing ring and the cylinder inner wall. The piston ring assembly according to the invention is therefore particularly suitable as a so-called pressure breaker arrangement, the task of which is to break or seal off pressure peaks occurring during compression, whereas such a pressure breaker arrangement may have a certain leakage in the direction of the longitudinal axis. The piston ring assembly according to the invention thus has the particular advantage that dynamically acting pressure forces can be considerably reduced, so that preferably essentially only a static pressure is applied to the piston rings arranged along the second section of the piston and sealing off a static pressure, but no longer the dynamic pressure having high pressure components, with the result that considerably smaller pressure forces act on the piston rings sealing off the static pressure, which considerably increases their service life or service life.

The invention is described in detail below on the basis of several embodiments.

BRIEF DESCRIPTION OF THE DRAWINGS

The drawings used to explain the embodiments show:

FIG. 4 a bottom view of the ring carrier shown in FIG. 2;

FIG. 5 a cross-section through the ring carrier along section line A-A;

FIG. 6 a detailed view of the center of FIG. 4;

FIG. 10 a section through the piston ring assembly according to FIG. 7 along the line of intersection B-B;

FIG. 11 a section through the piston ring assembly according to FIG. 8 along the line of intersection D-D;

FIG. 12 a section through the piston ring assembly according to FIG. 8 along the line of intersection C-C;

In principle, the same parts are given the same reference signs in the drawings.

Ways to Carry Out the Invention

Figure 1:
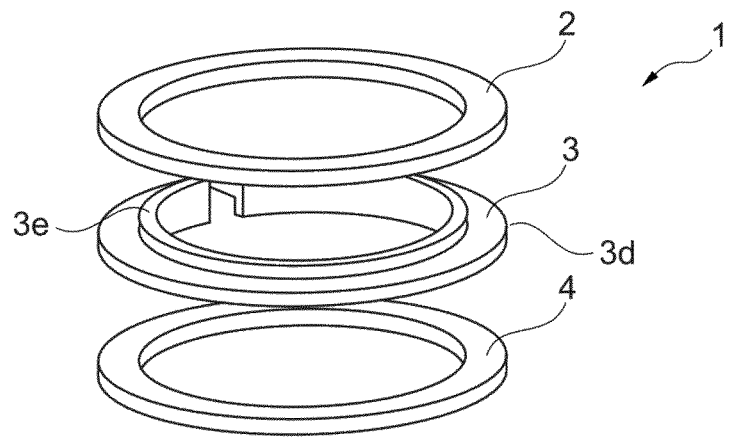
FIG. 1 a perspective exploded view of a piston ring assembly.

FIG. 1 shows a first embodiment of a piston ring assembly 1 comprising a first endless sealing ring 2, a second endless sealing ring 4, and a one piece or one-part ring carrier 3.

Figure 2:
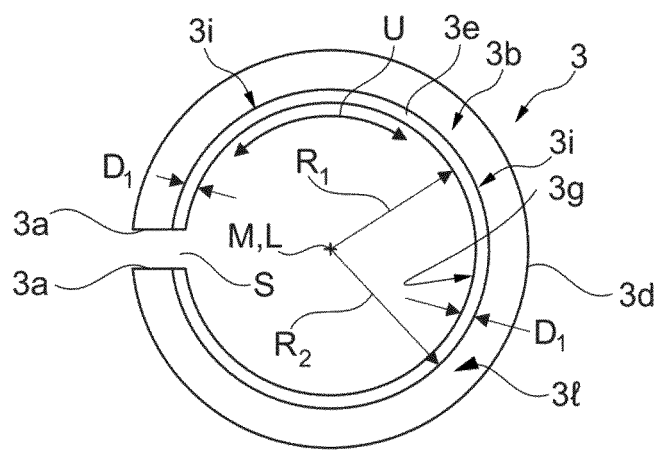
FIG. 2 a top view of the ring carrier shown in FIG. 1.

FIG. 2 shows a plan view of the ring carrier 3 shown in FIG. 1. The ring carrier 3 extends in a circle around a ring carrier center M in a circumferential direction U and has a longitudinal axis L running perpendicular to the circumferential direction U and through the ring carrier center M. The ring carrier 3 has an end portion 3a on each side in the circumferential direction U, which are spaced apart from each other in the circumferential direction U and form a butt or gap S. The gap S preferably has a width in the circumferential direction U in the range between 1% and 5% of the outer circumference of the sealing ring 2. The sealing ring 2 preferably has a diameter in the range between 30 mm and 250 mm, and thus preferably has an outer circumference in the range between 94 mm and 785 mm. The ring carrier 3 comprises a first ring carrier web 3e, which extends in the direction of the longitudinal axis L, which extends concentrically to the ring carrier center M in the circumferential direction U, and which has a constant wall thickness D1. The concave inner surface 3g of the first ring carrier web 3e has an inner radius $R_1$, and the convex outer surface 3i of the first ring carrier web 3e has a first outer radius $R_2$. The ring carrier 3 also includes an intermediate web 3d that projects radially with respect to the longitudinal axis L beyond the first ring carrier web 3e. The first ring carrier web 3e and the intermediate web 3d form a first recess 3b for receiving the first endless sealing ring 2. The recess 3b is bounded by a bearing surface 3l running perpendicular to the longitudinal axis L and the convex outer surface 3i.

Figure 3:
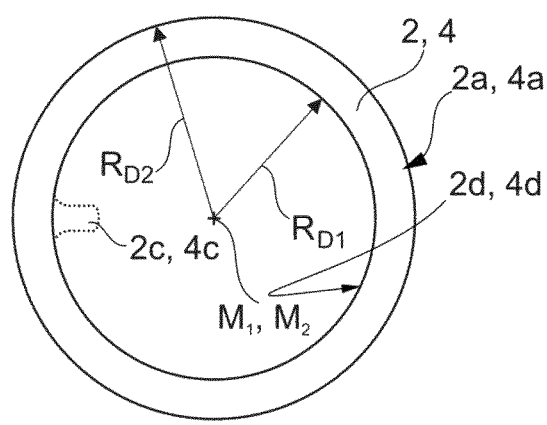
FIG. 3 a top view of the sealing ring shown in FIG. 1.

FIG. 3 shows a top view of the first sealing ring 2 having a first center point $M_1$, and having an inner radius $R_{D1}$ and an outer radius $R_{D2}$. Optionally, the sealing ring 2 can also comprise a fixing part 2c or an anti-rotation device 2c, for example, as shown in dashed lines in FIG. 3, a nose projecting towards the first center point $M_1$. FIG. 3 also shows a top view of the second sealing ring 4, which in the embodiment shown is identical in design to the first sealing ring 2. The second sealing ring 4 has a second center point $M_2$, and in turn has an inner radius $R_{D1}$ and an outer radius $R_{D2}$, and can also optionally have a fixing part 4c. In addition, both sealing rings 2, 4 have an outer circumferential surface 2a, 4a, and an inner circumferential surface 2d, 4d, at the end faces. Preferably, the first and second sealing rings 2, 4 are of identical design, as shown in FIG. 3. However, the first sealing ring 2 and the second sealing ring 4 could also each have a different inner radius $R_{D1}$.

FIG. 4 shows a top view of the rear side of the ring carrier 3 shown in FIG. 2. The ring carrier 3 is designed to receive the first and the second sealing ring 2, 4 in such a way that the first and the second sealing ring 2, 4 are arranged one after the other in the direction of the longitudinal axis L, and that their first and second centers $M_1$, $M_2$ are arranged radially and transversely to the longitudinal axis L at a distance from or offset to each other. The ring carrier 3 comprises a second ring carrier web 3f, the concave inner surface 3g of which extends in the circumferential direction U concentrically with respect to the ring carrier center M, so that the common inner surface 3g of the first ring carrier web 3e and of the second ring carrier web 3f have an identical concave course or have an identical course in the direction of the longitudinal axis L, respectively. The second ring carrier web 3f extends with respect to the longitudinal axis L in the circumferential direction U, and moreover extends in the direction of the longitudinal axis L. The ring carrier 3 in turn comprises the intermediate web 3d, which projects radially with respect to the longitudinal axis L beyond the second ring carrier web 3f. The second ring carrier web 3f as well as the intermediate web 3d form a second recess 3c for receiving the second endless sealing ring 4. The second recess 3c is bounded by a bearing surface 3k of the intermediate web 3d extending perpendicular to the longitudinal axis L as well as by a convex outer surface 3h of the second ring carrier web 3f. The concave inner surface 3g of the second ring carrier web 3f runs concentrically to the ring carrier center point M, as can also be seen in FIG. 2, and has the same inner radius $R_1$ as the first ring carrier web 3e. The first ring carrier web 3e shown in FIG. 2 has a constant wall thickness $D_1$ along the circumferential direction U. The second ring carrier web 3f shown in FIG. 4, on the other hand, has a wall thickness that varies in the circumferential direction U. The second ring carrier web 3f is designed in such a way that its convex outer surface 3h runs concentrically and circularly with respect to a third center point $M_3$. The third center point $M_3$ is slightly shifted to the left with respect to the ring carrier center point M, as shown in FIG. 4 and in even more detail in FIG. 6. FIG. 4 shows a symmetry plane N with respect to which the ring carrier 3 is symmetrical. Because the third center point $M_3$ is shifted slightly to the left with respect to the ring carrier center point M, the second ring carrier web 3f has a narrower wall thickness $D_2$ in the area of the intersection of the plane of symmetry N with the ring carrier 3 than the wall thickness $D_1$ of the first ring carrier web 3e, wherein the wall thickness of the second ring carrier web 3f, starting from the narrower wall thickness $D_2$ at the plane of symmetry N, increases in the circumferential direction U towards the gap S to the wider wall thickness $D_3$. FIG. 4 shows a first auxiliary line $N_1$ and a second auxiliary line $N_2$, where the first auxiliary line $N_1$ runs through the ring carrier center M, and where the second auxiliary line $N_2$ runs through the third center $M_3$, so that their offset, as can be seen in particular from FIG. 6, represents the center distance $M_D$ between the ring carrier center M and the third center $M_3$. The center distance $M_D$ between the first and second center $M_1$, $M_2$ of the first and second sealing rings 2, 4 is preferably in a range between 0.1 mm and 10 mm.

FIG. 6 shows a detailed view of the center of FIG. 4, in which the aspect described earlier is shown enlarged, namely that the ring carrier center M and the third center $M_3$ are mutually spaced apart by the center distance $M_D$. When the first sealing ring 2 and the second sealing ring 4 are arranged in the ring carrier 3 shown in FIG. 4, the first center $M_1$ of the first sealing ring 2 is identical to the ring carrier center M, and the second center $M_2$ of the second sealing ring 4 is identical to the third center $M_3$. The first sealing ring 2 and the second sealing ring 4, which are arranged together in the ring carrier 3, are thus mutually held in the ring carrier 3, radially to the longitudinal axis L, with a mutual distance predetermined by the ring carrier 3. FIGS. 1, 2 and 4 show the ring carrier 3 in a relaxed state. As described below, the ring carrier 3 is elastically deformable, which means that the center distance $M_D$ between the ring carrier center point M and the third center point $M_3$ can change depending on the degree of elastic deformation of the ring carrier 3.

FIG. 5 shows a section through the ring carrier 3 along the line of intersection A-A according to FIG. 4. This shows in particular that the first ring carrier web 3e has a wall thickness $D_1$, and that the second ring carrier web 3f has a narrower wall thickness $D_2$ at the intersection A-A, or in other words, the convex outer surface 3h running concentrically and circularly with respect to the third center point $M_3$ is displaced to the left with respect to the convex outer surface 3i running concentrically and circularly with respect to the ring carrier center point M, in the selected representation, convex outer surface 3i, which extends concentrically and circularly relative to the ring carrier center M, by the center distance $M_D$, in the selected representation is shifted to the left, wherein the course of the two convex outer surfaces 3h, 3i determine the location of the center of the first and second sealing ring 2, 4, so that the first center $M_1$ of the first sealing ring 2 and the second center $M_2$ of the second sealing ring 4 likewise have a mutual spacing corresponding to the center distance $M_D$.

Figure 7:
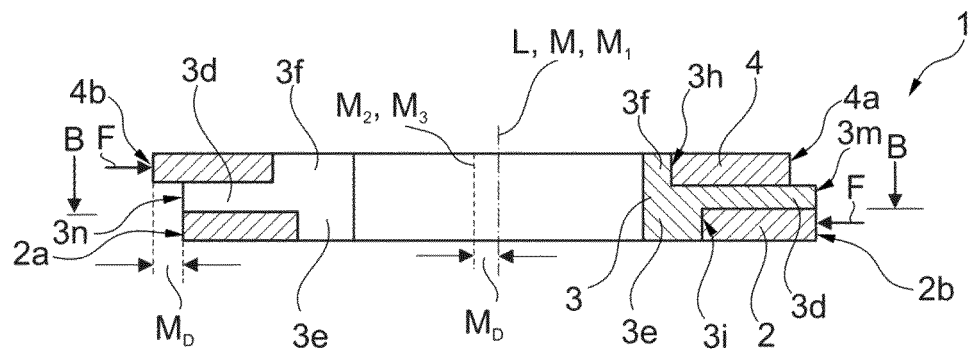
FIG. 7 a longitudinal section through a piston ring assembly in the relaxed state.

FIG. 7 shows a longitudinal section through an embodiment of a piston ring assembly 1 along the plane of symmetry N shown in FIG. 4, wherein the piston ring assembly 1 consists of the ring carrier 3 and the first and second sealing rings 2, 4. For a better representation of the ring carrier 3 and the sealing rings 2, 4, these are shown enlarged in the piston ring assembly 1 shown in FIGS. 7 to 12, compared to the embodiment according to FIGS. 1 to 6, whereas the inner radius $R_1$ is shown reduced. The first and second sealing rings 2, 4 or their first and second center points $M_1$, $M_2$ are mutually offset in the ring carrier 3 by the center point distance $M_D$. Both the ring carrier 3 shown in FIG. 7 and the ring carriers 3 shown in FIGS. 1, 2, 4, 5, 9 and 10 are in a relaxed state. FIG. 7 also shows outer surfaces arranged opposite each other with respect to the longitudinal axis L, namely two outer surfaces 2a, 2b of the first sealing ring 2, two outer surfaces 4a, 4b of the second sealing ring 4, and two outer surfaces 3m, 3n of the ring carrier 3 and the intermediate web 3d, respectively.

Figure 9:
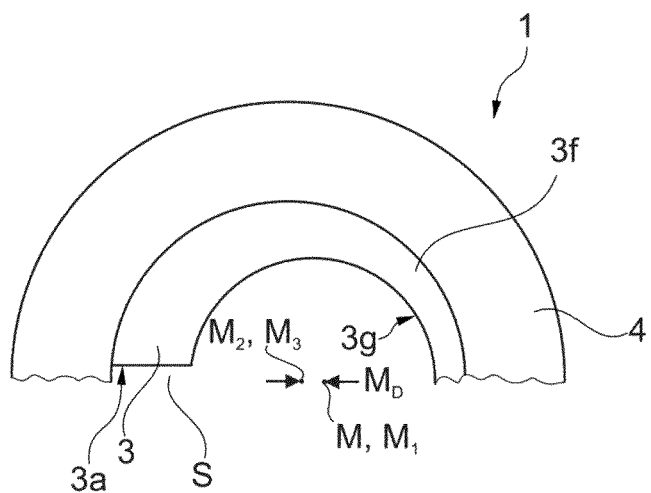
FIG. 9 a top view of the piston ring assembly shown in FIG. 7.

FIG. 9 shows a top view of the piston ring assembly 1 shown in FIG. 7, whereby the intermediate web 3d of the ring carrier 3 projecting to the right radially to the longitudinal axis L over the second sealing ring 4 is not shown. In addition, FIG. 9 shows the ring carrier center M, the first center $M_1$, the second center $M_2$, as well as the third center $M_3$ and the center distance $M_D$.

FIG. 10 shows a section through the piston ring assembly 1 shown in FIG. 7 along the line of intersection B-B. The first ring carrier web 3e and the first sealing ring 2 run concentrically to the ring carrier center M and the longitudinal axis L, respectively.

As shown in FIG. 7, the intermediate web 3d has an outer surface 3m, 3n running in the circumferential direction U and directed radially outwards with respect to the longitudinal axis L, the first recess 3b having the same width radially with respect to the longitudinal axis L as the first sealing ring 2 to be arranged therein, so that both the outer surface 3m and the outer surface 2b of the first sealing ring 2, in the view shown on the right, can bear together against an inner wall of a cylinder 11 and both outer surfaces 3m, 2b are subject to wear in the region bearing against the inner wall 11a of the cylinder during operation of the piston 10.

Figure 8:
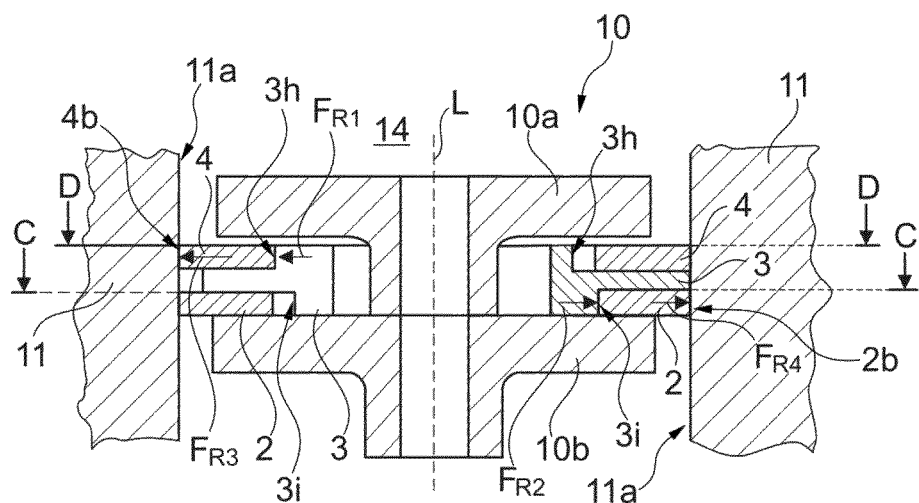
FIG. 8 a longitudinal section through a cylinder, a piston, and a piston ring assembly arranged in the piston.

FIG. 8 shows a longitudinal section through a reciprocating compressor comprising a cylinder 11 with an inner cylinder wall 11a, and comprising a piston 10 which is arranged movably in the direction of the longitudinal axis L within the cylinder 11. The piston 10 is configured as a so-called built piston, and comprises a first piston part 10a and a second piston part 10b, wherein the first piston part 10a and the second piston part 10b form an intermediate space in which the piston ring assembly 1 is arranged. The piston 10 may comprise a plurality of piston parts 10a, 10b and in particular also a plurality of piston ring assemblies 1 arranged in succession in their intermediate spaces in the direction of the longitudinal axis L. In order to introduce the piston ring assembly 1 shown in FIG. 7 into the interior of the cylinder 11, a force F must be exerted on both sides of the piston ring assembly 1, as shown in FIG. 7, on the first and second sealing rings 2, 4 and/or on the ring carrier 3, thereby elastically deforming the ring carrier 3, and thereby reducing the mutual distance $M_D$ of the centers of the sealing rings 2, 4, i.e. the distance between the first center point $M_1$ of the first sealing ring 2 and the second center point $M_2$ of the second sealing ring 4 in a direction radial to the longitudinal axis L, so that they can be accommodated within the cylinder 11. The elastic deformation of the ring carrier 3 results in it exerting a reaction force on the sealing rings 2, 4. In the embodiment shown in FIG. 8, the ring carrier 3 exerts a first, radially acting force FRI on the second sealing ring 4, and at the same time the ring carrier 3 exerts a force acting in the opposite direction to this, namely a second, radially acting force $F_{R2}$ on the first sealing ring 2. Since the second sealing ring 4 is in contact with the ring carrier 3 on the left via the convex outer surface 3h, the second sealing ring 4 exerts a force $F_{R3}$ acting radially on the inner cylinder wall 11a in the view shown to the left. Due to the elastic deformation of the ring carrier 3, a gap has formed on the right side between the convex outer surface 3h and the second sealing ring 4. Since the first sealing ring 2 is in contact with the ring carrier 3 on the right side via the convex outer surface 3i, the first sealing ring 2 exerts a force $F_{R4}$ acting radially on the inner cylinder wall 11a in the view to the right shown. Due to the elastic deformation of the ring carrier 3, a gap has formed on the left-hand side between the convex outer surface 3i and the first sealing ring 2. The piston ring assembly 1 according to the invention thus has the characteristic that the first sealing ring 2 is pressed with its outer surface 2b against the cylinder inner wall 11a, and that the second sealing ring 4 is pressed on the opposite side with its outer surface 4b against the cylinder inner wall 11a. FIG. 11 shows a top view of the piston ring assembly 1 shown in FIG. 8 from the direction of view D-D, whereby the first piston part 10a, the second piston part 10b and the cylinder 11 are not shown. The deformation of the ring carrier 3 results in a gap forming on the right between the second sealing ring 4 and the convex outer surface 3h, so that the bearing surface 3k extending perpendicular to the longitudinal axis L becomes visible. FIG. 12 shows a section through the piston ring assembly 1 shown in FIG. 8 along the line of intersection C-C, whereby the first piston part 10a, the second piston part 10b and the cylinder 11 are not shown. The deformation of the ring carrier 3 results in a gap forming on the left between the first sealing ring 2 and the convex outer surface 3i. The deformation of the ring carrier 3 is not shown to scale in FIGS. 11 and 12, but only by way of indication.

Figure 13:
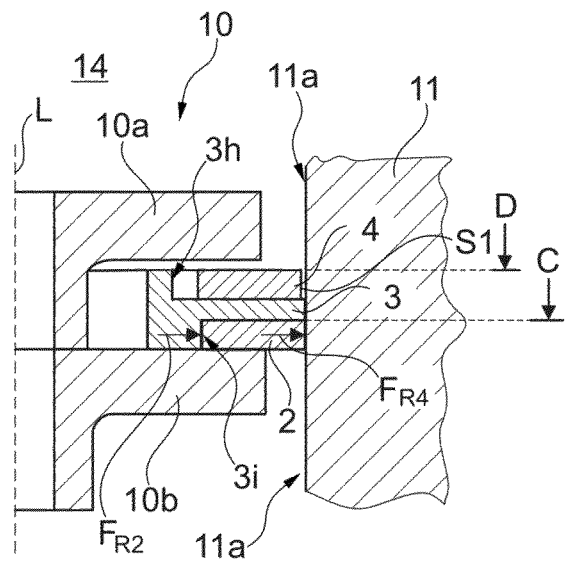
FIG. 13 a detailed aspect of the longitudinal section according to FIG. 8.

FIG. 13 shows a slightly enlarged section of the longitudinal section shown in FIG. 8. When new, the first and second sealing rings 2, 4 have either the same outside diameter as the inside diameter of the cylinder 11, and preferably an outside diameter which is smaller than the inside diameter of the cylinder 11, the outside diameter preferably being at least 0.1% smaller than the inside diameter of the cylinder 11, and particularly preferably at least 3% smaller. The cylinder 11 preferably has an inner diameter in the range between 30 mm and 250 mm. As described in FIG. 8, the ring carrier 3 presses the second sealing ring 4 against the left-hand inner cylinder wall 11a in the view shown, so that, as shown in FIG. 13, a gap $S_1$ is formed between the right-hand inner cylinder wall 11a and the outer surface 4a of the second sealing ring 4. As described in FIG. 8, the first sealing ring 2 is pressed against the right-hand inner cylinder wall 11a in the opposite direction by the ring carrier 3, so that a gap $S_1$, which is not shown, is formed between the left-hand inner cylinder wall 11a, which is not shown in FIG. 13, and the first sealing ring 2.

Before the piston ring assembly 1 according to the invention is inserted into the interior of the cylinder 11, the ring carrier 3 must be elastically deformed so that the piston ring assembly fits in the interior of the cylinder 11. After insertion into the interior of the cylinder 11, the piston ring assembly 1 is clamped between the inner wall 11a of the cylinder 11, as shown in FIGS. 8 and 13. During a depressurized state of the reciprocating compressor, i.e. when the compressor is at a standstill and when the piston 10 is at rest, respectively, the first sealing ring 2 and the second sealing ring 4 are pressed against the inner wall 11a of the cylinder in opposite directions with a force $F_{R3}$ and $F_{R4}$, respectively, as shown in FIG. 8. The design of the ring carrier 3 and its elastic deformation within the cylinder 11 ensure that the first sealing ring 2 and the second sealing ring 4 are pressed against the inner cylinder wall 11a in the resting state. Thus, the first sealing ring 2 and the second sealing ring 4 assume an initial position in the resting state, which is of importance for the subsequent compression process. If the piston 10 shown in FIG. 8 is moved upward, or if the compression chamber 14 is reduced in size by the movement of the piston 10 and the contents of the compression chamber 14 are compressed, this results in a pressure increase of the fluid located in the compression chamber 14. This pressure increase results in the first sealing ring 2 and the second sealing ring 4 being pressed against the inner cylinder wall 11a with even greater force $F_{R3}$ and $F_{R4}$, respectively, so that even if the fluid to be compressed has a higher pressure, a sufficiently large contact force of the sealing rings 2, 4 against the inner cylinder wall 11a is ensured.

The piston ring assembly 1 according to the invention comprises a first sealing ring 2 and a second endless sealing ring 4, both sealing rings 2, 4 being annular and endless, i.e. running through 360° in the circumferential direction and having no gap. This annular design has the advantage that the first and second sealing rings 2, 4 can be designed to be particularly stable, and the strength of the sealing rings 2, 4 can also be increased by a choice of material adapted to the acting pressure, so that cold flow of the sealing rings 2, 4 can be avoided. The piston ring assembly 1 according to the invention is therefore also particularly suitable for compressing a fluid to a very high final pressure of, for example, up to 500 bar, in particular for compressing hydrogen. Such a sealing ring is made of a wearable material, in particular a metal such as bronze, gray cast iron or sintered iron, or a plastic such as PTFE, filled PTFE or high-temperature polymers such as PEEK, PI or epoxy.

The ring carrier 3 may, but need not, be made of a wearable material. The ring carrier 3 is preferably made of a metal, in particular steel, stainless steel, bronze or gray cast iron, or of a plastic, in particular PTFE, filled PTFE or high-temperature polymers such as PEEK, PI or epoxy.

Figure 14:
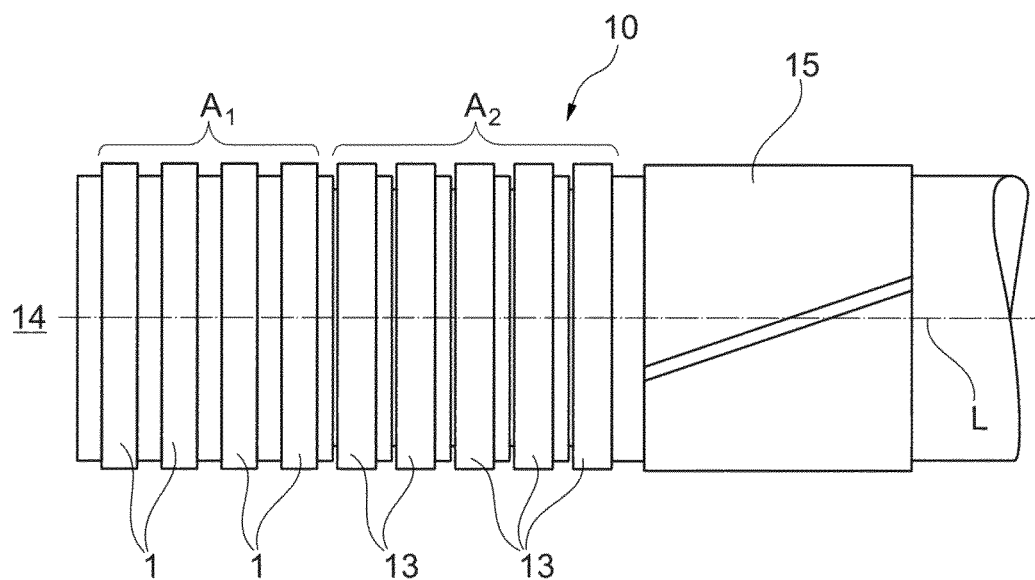
FIG. 14 a side view of a piston with piston ring assemblies arranged therein.

FIG. 14 shows a side view of a piston 10 extending in the direction of the longitudinal axis L, the cylinder 11 not shown and the piston 10 delimiting the compression chamber 14. Starting from the compression chamber 14, the piston 10 has, in the direction of the longitudinal axis L, a first partial section $A_1$ and subsequently a second partial section $A_2$, wherein at least one piston ring assembly 1 is arranged along the first partial section $A_1$, in the illustrated embodiment example there are four piston ring assemblies 1 spaced apart from one another in the direction of the longitudinal axis L, and wherein along the second partial section $A_2$ at least one piston ring 13 sealing a static pressure is arranged, wherein in the illustrated embodiment example there are five piston rings 13 mutually spaced in the direction of the longitudinal axis L. In addition, a guide ring 15 is also arranged on the piston 10. Such piston rings 13 sealing a static pressure are disclosed, for example, in documents EP1275888A1 or WO2018/108464A1. Preferably, the at least one piston ring assembly 1 reduces at least a dynamic pressure component.

Preferably, the pressure present in the compression chamber 14 is reduced in the longitudinal direction L along the piston 10 in two different ways, in that in the direction of the longitudinal axis L, starting from the compression chamber 14, dynamic pressure components are reduced along the first partial section $A_1$ of the piston 10, and in that static pressure components are reduced in the subsequent, second partial section $A_2$.

Figure 15:
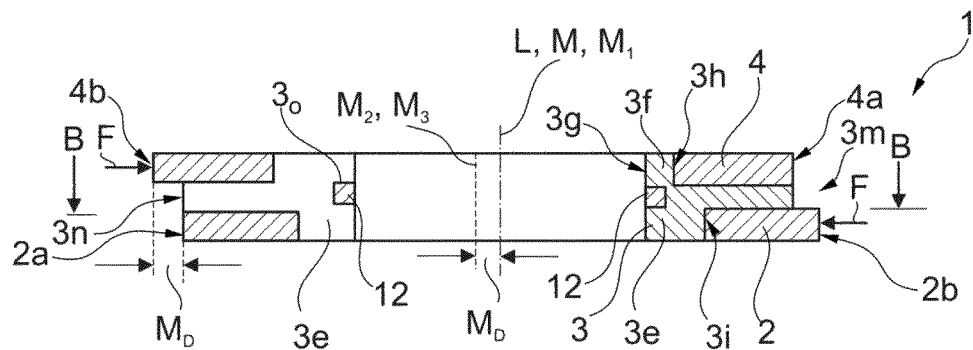
FIG. 15 a longitudinal section through a further embodiment of a piston ring assembly in the relaxed state.

FIG. 15 shows a further embodiment of a piston ring assembly 1. In contrast to the embodiment shown in FIG. 7, the ring carrier 3 in the embodiment shown in FIG. 15 has a smaller outer diameter, so that the outer surface 3*m* is displaced towards the longitudinal axis L. The outer diameter of the ring carrier 3 is smaller than the outer diameter of the piston ring assembly 1. This embodiment has the advantage that it is ensured that only the first sealing ring 2 and the second sealing ring 4 can come into contact with the inner cylinder wall 11*a*, or that the reaction force F caused by the inner cylinder wall 11*a* is introduced into the piston ring assembly 1 exclusively via the first sealing ring 2 and the second sealing ring 4.

As indicated in FIG. 15, it may prove advantageous to provide the piston ring assembly 1 with a spring 12 which exerts a force acting radially outwards with respect to the longitudinal axis L on the ring carrier 3. The embodiment example shown in FIG. 15 shows a spring 12 which extends in the circumferential direction U, and which is preferably arranged in a groove 30 which extends circumferentially in the circumferential direction U and which is let into the concave inner surface 3*g* of the ring carrier 3. The spring 12 can extend along a partial circumference or along the entire circumference of the inner surface 3*g*.

Figure 16:
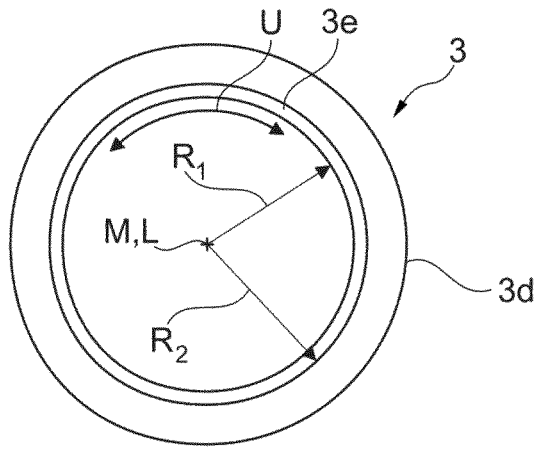
FIG. 16 a top view of a further embodiment of a piston ring assembly in the relaxed state.

FIG. 16 shows a top view of a further embodiment of a ring carrier 3, which is of endless or one piece design, and in particular of annular design, and therefore, in contrast to the embodiment shown in FIG. 2, does not have a butt or a gap S. By a suitable choice of elastic material, it is possible to give the ring carrier 3 such elastic properties that a butt S can be dispensed with for the ring carrier 3.

Figure 17:
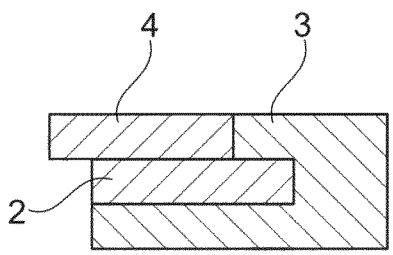
FIG. 17 a detailed view of a section through a further embodiment of a piston ring assembly.
Figure 18:
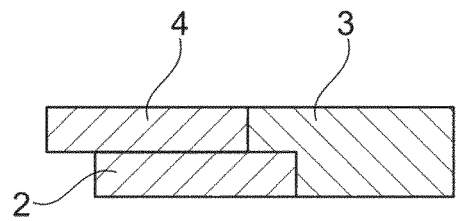
FIG. 18 a detailed view of a section through a further embodiment of a piston ring assembly.

FIGS. 17 and 18 each show a detailed view of a section through a further embodiment of a piston ring assembly 1, wherein the first sealing ring 2 and the second sealing ring 4 are arranged in immediate succession in the direction of progression of the longitudinal axis L and are arranged in the ring carrier 3. Preferably, the first and the second sealing rings 2, 4 are in contact with each other in the direction of the longitudinal axis L.

The first and/or the second sealing ring 2, 4 of the piston ring assembly 1 preferably have the same width along the entire circumference in the direction radial to the longitudinal axis L. In a further possible embodiment, however, the width in the circumferential direction could also vary.

Figure 19:
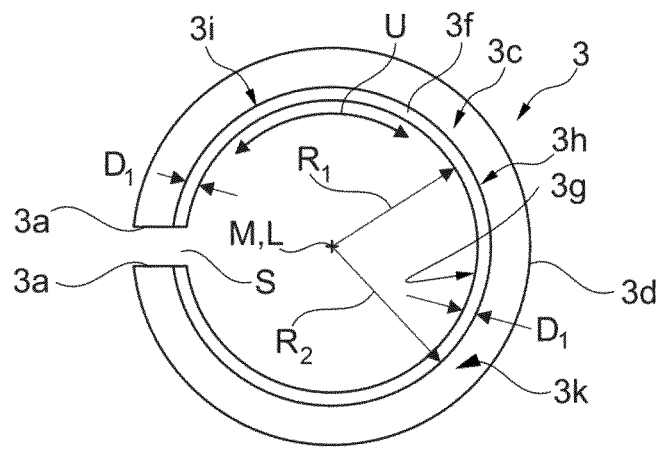
FIG. 19 a bottom view of a further embodiment of the ring carrier shown in FIG. 2.
Figure 20:
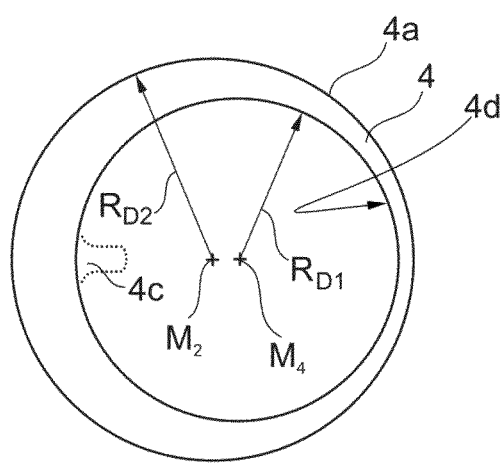
FIG. 20 a top view of a further embodiment of a sealing ring.
Figure 21:
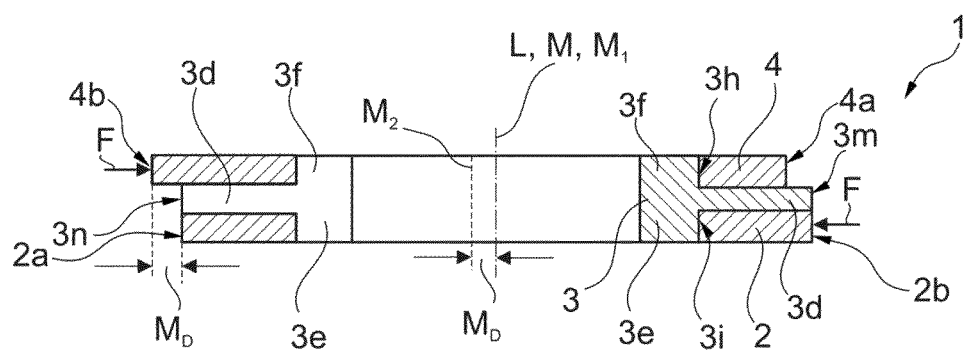
FIG. 21 a longitudinal section through a further piston ring assembly in the relaxed state.

FIG. 19 shows a bottom view of a further embodiment of a ring carrier 3, the upper side of which is designed as shown in FIG. 2. The upper and lower sides of such a ring carrier 3 are thus identical. FIG. 20 shows a top view of a further embodiment of a second sealing ring 4. In contrast to the second sealing ring 4 according to FIG. 3, in which the inner circumferential surface 4*d* and the outer circumferential surface 4*a* have the same second center $M_2$, in the embodiment according to FIG. 20 the inner circumferential surface 4*d* or its fourth center $M_4$ is displaced with respect to the outer circumferential surface 4*a* or its second center $M_2$. The inner circumferential surface 4*d* thus runs eccentrically with respect to the outer circumferential surface 4*a*. FIG. 21 shows a longitudinal section through a piston ring assembly 1 in the relaxed state, wherein the two sides of the ring carrier 3 are identically shaped as shown in FIGS. 19 and 2, and wherein the first sealing ring 2 is shaped as shown in FIG. 3, and wherein the second sealing ring 4 is shaped as shown in FIG. 20. The ring carrier 3 has a ring carrier center M and a longitudinal axis L. The first center point $M_1$ of the first sealing ring 2 is located in the direction of the longitudinal axis L in the identical position as the ring carrier center point M, whereas the second center point $M_2$ of the second sealing ring 4 is shifted to the left by the center point distance $M_d$ in the view shown. The technical effect that the first and second center $M_1, M_2$ of the first and second sealing rings 2, 4 are mutually spaced radially with respect to the longitudinal axis L can thus be achieved, as shown in FIG. 7, by the fact that the first and second recesses 3*b*, 3*c* and their convex outer surfaces 3*h*, 3*i*, respectively, are radially displaced with respect to the longitudinal axis L, and/or that the first and/or second sealing ring 2, 4, as shown in FIG. 20, each has an inner circumferential surface 4*d* and an outer circumferential surface 4*a* which are radially displaced with respect to the longitudinal axis L. FIGS. 7 and 21 show two embodiments of piston ring assemblies 1 whose outer circumferential surfaces 2*a*, 4*a* extend identically, and which have the identical center distance $M_d$ radially with respect to the longitudinal axis L. The piston ring assembly 1 shown in FIG. 21 can be arranged in the interior of the cylinder 11 in the same way as shown in FIG. 8. In another possible embodiment, both the first and the second sealing rings 2, 4 may be eccentrically configured as shown in FIG. 20. Preferably, the first and/or second sealing ring 2, 4 comprises an anti-rotation device 4*c*, which, as shown in FIG. 20, may for example have a nose-shaped configuration. In a further embodiment, the inner circumferential surface 2*d*, 4*d* of the first and/or second sealing ring 2, 4 and the convex outer surface 3*i*, 3*h* of the ring carrier 3 may not have a circular course as shown, but may have, for example, an elliptical, polygonal or toothed course, so that this mutual shaping of ring carrier 3 and first and/or second alignment ring 2, 4 forms an anti-rotation device.

The invention claimed is:

1. A piston ring assembly comprising a first endless sealing ring and a second endless sealing ring and an elastic ring carrier, the first sealing ring and the second sealing ring running in a circumferential direction U and each having an outer circumferential surface, the first sealing ring having a first center point $M_1$ with respect to its outer circumferential surface and the second sealing ring having a second center point $M_2$ with respect to its outer circumferential surface, the first sealing ring and the second sealing ring each having a longitudinal axis L running perpendicular to the circumferential direction U, wherein the ring carrier runs in the circumferential direction U, and wherein the ring carrier, the first sealing ring and the second sealing ring are designed to be mutually adapted in such a way that the first sealing ring and the second sealing ring are arranged one after the other in the ring carrier in the direction of the longitudinal axis L, and in that their first and second center points $M_1, M_2$ are arranged at a distance from one another radially with respect to the longitudinal axis L, wherein, in the intended use of the piston ring assembly, the first sealing ring and the second sealing ring are pressed in opposite directions against the inner wall of a cylinder.

2. The piston ring assembly according to claim 1, wherein the ring carrier is designed in one piece.

3. The piston ring assembly according to claim 1, wherein the ring carrier has, in the circumferential direction U, a butt S with a butt clearance.

4. The piston ring assembly according to claim 1, wherein the ring carrier has an intermediate web extending radially with respect to the longitudinal axis L, and wherein the first sealing ring and the second sealing ring bear against the intermediate web at a mutual distance in the direction of the longitudinal axis L.

5. The piston ring assembly according to claim 1, wherein the ring carrier comprises a first recess for receiving the first sealing ring and a second recess for receiving the second sealing ring, the first recess and the second recess being mutually offset both in the direction of the longitudinal axis L and in the direction radial to the longitudinal axis L.

6. The piston ring assembly according to claim 1, wherein the ring carrier comprises a first recess for receiving the first sealing ring and a second recess for receiving the second sealing ring, wherein the first recess and the second recess are arranged offset only in the direction of the longitudinal axis L, but not in the direction radial to the longitudinal axis L, and wherein at least one of the first sealing ring and the second sealing ring has an inner circumferential surface which extends eccentrically to the respective outer surface.

7. The piston ring assembly according to claim 1, wherein the first center point $M_1$ and the second center point $M_2$ have a mutual distance radially to the longitudinal axis L in the range between 0.1 mm to 10 mm.

8. The piston ring assembly according to claim 1, wherein the piston ring assembly comprises a spring extending in the circumferential direction U, which spring exerts a force acting outwardly with respect to the longitudinal axis L on the ring carrier.

9. The piston ring assembly according to claim 1, wherein the first sealing ring and the second sealing ring consist of a wearable material wherein additionally or alternatively the ring carrier consists of a metal.

10. The piston ring assembly according to claim 1, wherein the at least one of the first sealing ring and the second sealing ring protrude beyond the ring carrier in the direction of the longitudinal axis L.

11. The piston ring assembly according to claim 1, wherein the first sealing ring and the second sealing ring are arranged immediately following one another in the direction of progression of the longitudinal axis L.

12. A piston compressor comprising a cylinder, a piston arranged in the cylinder, and at least one piston ring assembly according to claim 1 arranged on the piston.

13. The piston compressor according to claim 12, wherein the first sealing ring and the second sealing ring in a new state have an outer radius which is at least 0.1% smaller than the inner radius of the cylinder.

14. The piston compressor according to claim 13, wherein the first sealing ring and the second sealing ring in the new state have an outer radius which is at least 3% smaller than the inner radius of the cylinder.

15. The piston compressor according to claim 12, wherein the cylinder and the piston delimit a compression chamber, wherein the piston, starting from the compression chamber, has in the direction of the longitudinal axis L a first partial section and subsequently a second partial section, wherein at least one piston ring assembly is arranged along the first partial section, and wherein at least one piston ring sealing a static pressure is arranged along the second partial section.

* * * * *